(12) United States Patent
Shah et al.

(10) Patent No.: US 6,608,419 B2
(45) Date of Patent: Aug. 19, 2003

(54) FLUX SHUNT FOR A POWER GENERATOR STATOR ASSEMBLY

(75) Inventors: Manoj Ramprasad Shah, Latham, NY (US); Sameh Ramadan Salem, Rexford, NY (US); Ronald Irving Longwell, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/749,197

(22) Filed: Dec. 27, 2000

(65) Prior Publication Data

US 2002/0079875 A1 Jun. 27, 2002

(51) Int. Cl.$^7$ .............................. H02K 1/00; H02K 1/22; H02K 3/00
(52) U.S. Cl. ...................... 310/216; 310/264; 310/179
(58) Field of Search ................. 310/216, 264, 310/179

(56) References Cited

U.S. PATENT DOCUMENTS

| | | | |
|---|---|---|---|
| 1,689,188 A | 10/1928 | Pohl et al. .................... 310/256 |
| 3,100,271 A | 8/1963 | Darrieus et al. ............. 310/256 |
| 3,114,063 A | 12/1963 | Karsten ........................ 310/256 |
| 3,731,127 A | 5/1973 | Harrington .................. 310/254 |
| 4,258,281 A | 3/1981 | Calfo et al. .................. 310/256 |
| 5,174,880 A | 12/1992 | Bourez et al. ......... 204/298.17 |
| 5,366,607 A | 11/1994 | Lal et al. ................. 204/289.19 |
| 5,512,150 A | 4/1996 | Bourez et al. ............ 204/192.2 |
| 5,685,959 A | 11/1997 | Bourez et al. ............ 204/192.2 |
| 5,869,912 A | 2/1999 | Andrew et al. ................ 310/52 |
| 6,025,666 A | 2/2000 | Kliman ......................... 310/156 |
| 6,104,116 A | 8/2000 | Fuller et al. ................. 310/217 |
| 6,127,761 A | 10/2000 | Shen et al. .................. 310/260 |
| 6,157,109 A * | 12/2000 | Schiferl et al. .............. 210/254 |
| 6,222,296 B1 * | 4/2001 | Sakai et al. .................. 310/216 |
| 6,225,444 B1 * | 5/2001 | Shashoua ..................... 530/345 |
| 6,429,567 B1 | 8/2002 | Shah et al. ................... 310/197 |
| 6,455,977 B2 * | 9/2002 | Leyvraz et al. .............. 310/254 |
| 6,462,457 B2 | 10/2002 | Shah et al. ................... 310/259 |

FOREIGN PATENT DOCUMENTS

| | | | |
|---|---|---|---|
| JP | 52097101 A | 8/1977 |
| JP | 52135007 A | 11/1977 |
| JP | 57040343 A | 3/1992 |
| JP | 2001327157 A | 11/2001 |

* cited by examiner

*Primary Examiner*—Nestor Ramirez
*Assistant Examiner*—Pedro J. Cuevas
(74) *Attorney, Agent, or Firm*—Banner & Witcoff, Ltd.

(57) ABSTRACT

A power generator that operates at a reduced temperature level includes a flux shunt that reduces the amount of fringing magnetic flux axially impinging upon a stator, flange, and multiple keybars during operation of the generator. By reducing the amount of axially impinging flux, the flux shunt reduces an operating temperature of the stator and flange and reduces a voltage differential between keybar voltages induced by the flux in the multiple keybars.

21 Claims, 11 Drawing Sheets ically extends from a proximal end of stator 102 to a distal
end of the stator in a first stator slot 106, and then returns
from the distal end of the stator to the proximal end of the
stator in a second stator slot 106, thereby forming a stator
winding loop. A rotation of rotor 110 inside of stator 102
FLUX SHUNT FOR A POWER GENERATOR STATOR ASSEMBLY

BACKGROUND OF THE INVENTION

The invention relates generally to a power generator, and in particular to a reduction of heat dissipation and undesirable voltage differentials in a power generator.

Thermal issues are critical to the design of a high power electrical generator and can serve as limiting factors in generator operation. A typical design of a high power electric generator includes a rotor having rotor windings rotatably disposed inside of a stator having stator windings. The rotation of the rotor induces an electromagnetic field in the stator, which electromagnetic field in turn induces a current in, and voltage drop across, the stator windings. However, the electromagnetic field also induces eddy currents in the stator, which is magnetically and electrically resistive. The eddy currents cause the dissipation of energy in the stator in the form of heat and impose a thermal constraint on the operation of the generator.

In order to improve generator efficiency and reduce generator size, generator manufacturers are constantly endeavoring to improve the thermal performance of the generator. For example, a prior art design of a high power electrical generator 100 is illustrated in FIGS. 1, 2, and 3. FIG. 1 is a cross-sectional view of generator 100 from an isometric perspective. FIG. 2 is a cut-away view of generator 100 along axis 2—2. As shown in FIGS. 1 and 2, electrical generator 100 includes a substantially cylindrical stator 102 having a stator core 104 and housing a substantially cylindrical rotor 110. Multiple circumferentially distributed and axially oriented keybars 118 are coupled together at each of a proximal end and a distal end by one of multiple flanges 204 (not shown in FIG. 1). Each keybar 118 is coupled to an outer surface of stator 102. The multiple keybars 118, together with the multiple flanges 204, form a keybar cage around the stator 102.

An inner surface of stator 102 includes multiple stator slots 106 that are circumferentially distributed around an inner surface of stator 102. Each stator slot 106 is radially oriented and longitudinally extends approximately a full length of stator 102. Each stator slot 106 receives an electrically conductive stator winding (not shown).

Rotor 110 is rotatably disposed inside of stator 102. An outer surface of rotor 110 includes multiple rotor slots 114 that are circumferentially distributed around the outer surface of rotor 110. Each rotor slot 114 is radially oriented and longitudinally extends approximately a full length of rotor 110. An air gap exists between stator 102 and rotor 110 and allows for a peripheral rotation of rotor 110 about axis 130.

Each rotor slot 114 receives an electrically conductive rotor winding (not shown). Each rotor winding typically extends from a proximal end of rotor 110 to a distal end of the rotor in a first rotor slot 114, and then returns from the distal end to the proximal end in a second rotor slot 114, thereby forming a loop around a portion of the rotor. When a direct current (DC) voltage differential is applied across a rotor winding at the proximal end of rotor 110, an electrical DC current is induced in the winding.

Similar to the rotor windings, each stator winding typically extends from a proximal end of stator 102 to a distal end of the stator in a first stator slot 106, and then returns from the distal end of the stator to the proximal end of the stator in a second stator slot 106, thereby forming a stator winding loop. A rotation of rotor 110 inside of stator 102 when a DC current is flowing in the multiple windings of rotor 110 induces electromagnetic fields in, and a passage of magnetic flux through, stator 102 and the loops of stator windings. The passage of magnetic flux in turn induces an alternating current in each stator winding and eddy currents and magnetic and resistive losses in stator 102.

FIG. 3 is a side view of a cross-section of generator 100 and illustrates a coupling of magnetic flux 302 from rotor 110 to stator 102 as the rotor rotates inside of the stator. Magnetic flux 302 generated by a rotation of rotor 110 couples to and passes through the surrounding stator 102. Magnetic flux 302 induces a flow of multiple eddy currents in the magnetically and electrically resistive stator 102, which currents cause energy dissipation and heat generation in the stator that poses a thermal constraint on the operation and capacity of generator 100. As a result, generator designers are always seeking improved methods of thermal management for power generator stators.

One known thermal management technique is the construction of stator core 104 from multiple ring-shaped laminations 402. FIG. 4 is a partial perspective of generator of 100 and illustrates a typical technique of constructing stator core 104. As shown in FIG. 4, the multiple ring-shaped laminations 402 are stacked one on top of another in order to build up stator core 104. Each lamination 402 is divided into multiple lamination segments 404. Each lamination segment 404 includes multiple slots 120 (not shown in FIG. 4), wherein at least one slot 120 of each segment 404 aligns with one of the multiple keybars 118. Each keybar in turn includes an outer side 124 and an inner, or locking, side 122 that mechanically mates with one of the multiple slots 120. Stator core 104 is then constructed by sliding each lamination segment 404, via one of the multiple slots 120, into the keybar cage formed by the multiple keybars 118. The coupling of one of the multiple slots 120 of a lamination segment 404 with a locking side 122 of a keybar 118 affixes each lamination segment 404, and thereby each lamination 402, in position in stator 102. By building stator core 104 from stacked laminations, as opposed to constructing a solid core, circulation of a current induced in stator 102 is limited to a lamination, thereby restricting current circulation and size and concomitantly reducing stator heating.

The above thermal management technique does not fully address thermal problems caused by a "fringing" of magnetic flux at each end of stator 102. As illustrated in FIG. 3, the "fringing" 304 of magnetic flux at each end of stator 102 results in a number of flux lines 302 axially, or normally, impinging upon each end of stator core 104 and upon the multiple flanges 204. A result of the fringing magnetic flux 304 is a greater flux density at each end of stator core 104 as compared to more centrally located portions of the stator core. The greater flux density at each end of stator core 104 results in increased eddy currents and greater heat dissipation in the laminations of stator core 104 near the ends of the stator, as opposed to more centrally located laminations. The fringing effect also results in increased eddy currents and greater heat dissipation in each flange 204.

In order to combat a buildup of heat at each end of stator 102 due to fringing magnetic flux 304, an inner surface of stator core 104, at each end of the stator core, is radially stepped away 202 from rotor 110, as shown in FIGS. 2 and 3. By increasing the distance between rotor 110 and stator core 104 at each end of the stator core, an amount of flux axially impinging upon each end of the stator core is reduced. However, the stepping of the ends of stator core 104 away from rotor 110 is only a partial solution to the stator core heat dissipation problem presented by "fringing"

and does not address the problem of heat dissipation in the multiple flanges 204.

A portion of the fringing magnetic flux 304 also impinges upon the ends of each of the multiple keybars 118. The impinging of fringing magnetic flux upon an end of a keybar 118 can produce an uneven coupling of flux into each keybar, with a greater flux density at a keybar end than in more centrally located portions of the keybar. The uneven coupling of flux can produce keybar voltages and keybar currents in each keybar 118. In turn, the existence of keybar voltages in each keybar 118 can produce keybar voltage differentials between keybars, which voltage differentials can be transmitted to the lamination segments 404 coupled to the keybars. When a voltage differential is transmitted to adjacent lamination segments 404, the voltage differential can cause arcing between the adjacent segments, overheating in stator core 104, and reduced generator 100 performance. The arcing can also create localized heating in stator core 104, causing lamination segments 404 and lamination rings 402 to fuse together. Such fusing can spread quickly in generator 100 as the lamination segments 404 and lamination rings 402 short circuit to each other, resulting in damage to the generator.

Therefore, a need exists for a method and apparatus for further reducing the heat dissipated in the ends of a stator core and in a flange and for providing for a more uniform coupling of flux into a keybar.

BRIEF SUMMARY OF THE INVENTION

Thus there is a particular need for a method and apparatus that reduces the heat dissipated in the ends of a stator core and in a flange and that provides for a more uniform coupling of flux into a keybar. Briefly, in accordance with an embodiment of the present invention, a flux shunt is provided for insertion adjacent to an inner surface of the stator and approximately at an end of the stator and wherein a permeability of the flux shunt is greater than a permeability of the stator core. The flux shunt reduces the amount of magnetic flux impinging in an axial direction upon the flanges and upon ends of the keybars and the stator core. By reducing the impinging flux, the flux shunt reduces the heat dissipated in the ends of stator and further provides for a more even coupling of flux into a keybar.

DETAILED DESCRIPTION OF THE INVENTION

Figure 1:
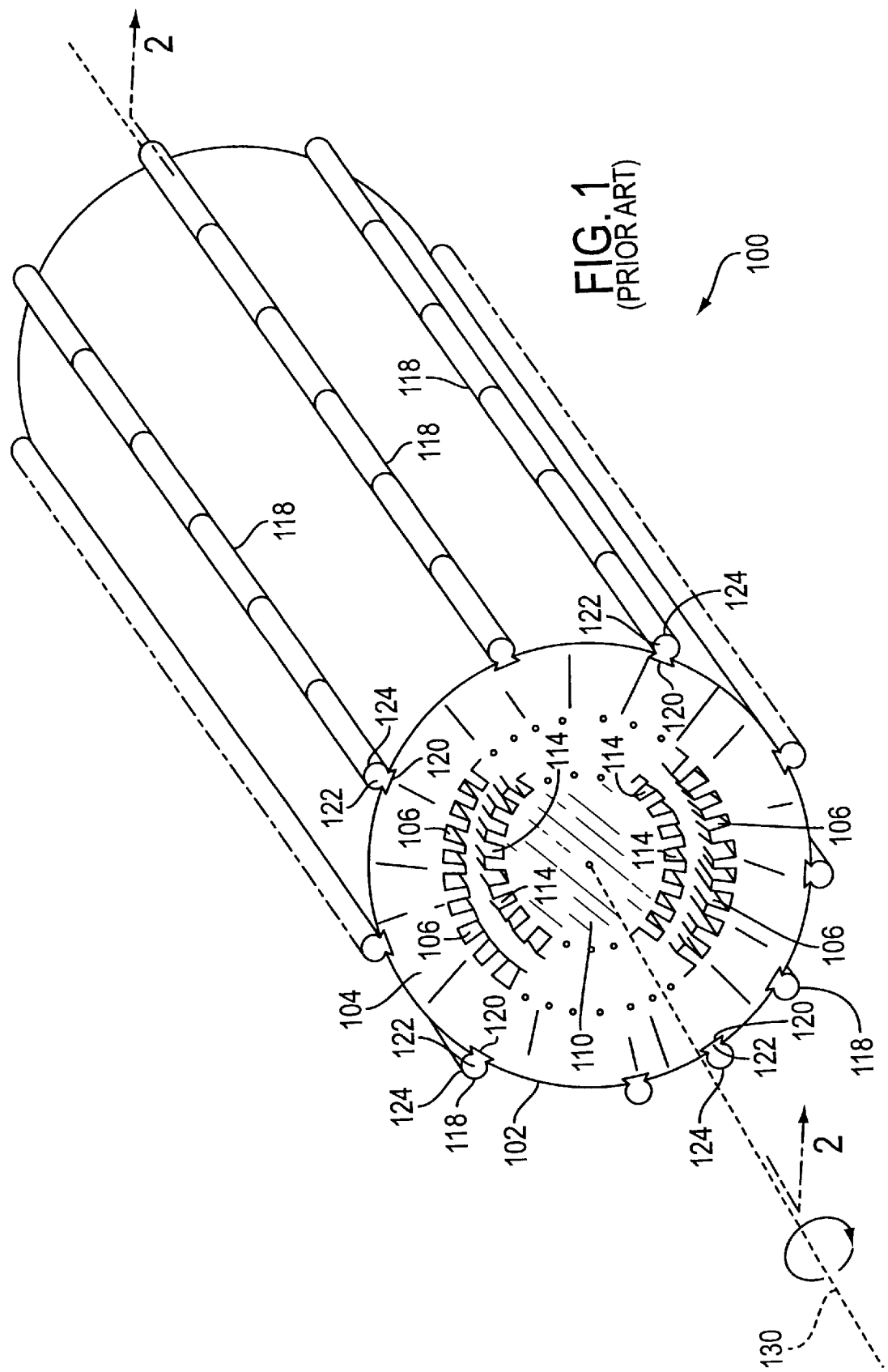
FIG. 1 is an isometric perspective of an end view of a cross-section of a power generator of the prior art.
Figure 2:
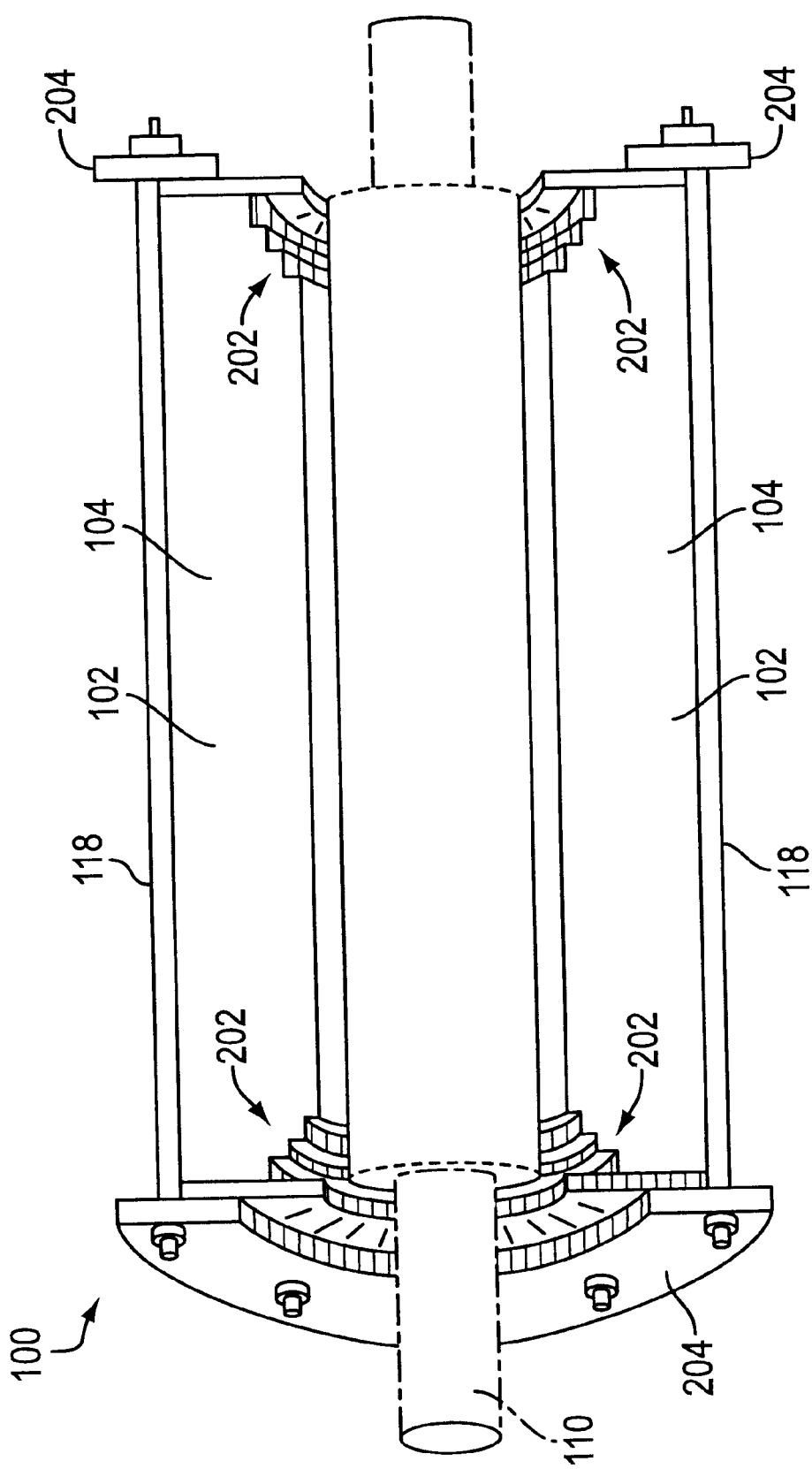
FIG. 2 is a cut-away view of the prior art power generator of FIG. 1 along axis 2—2.
Figure 3:
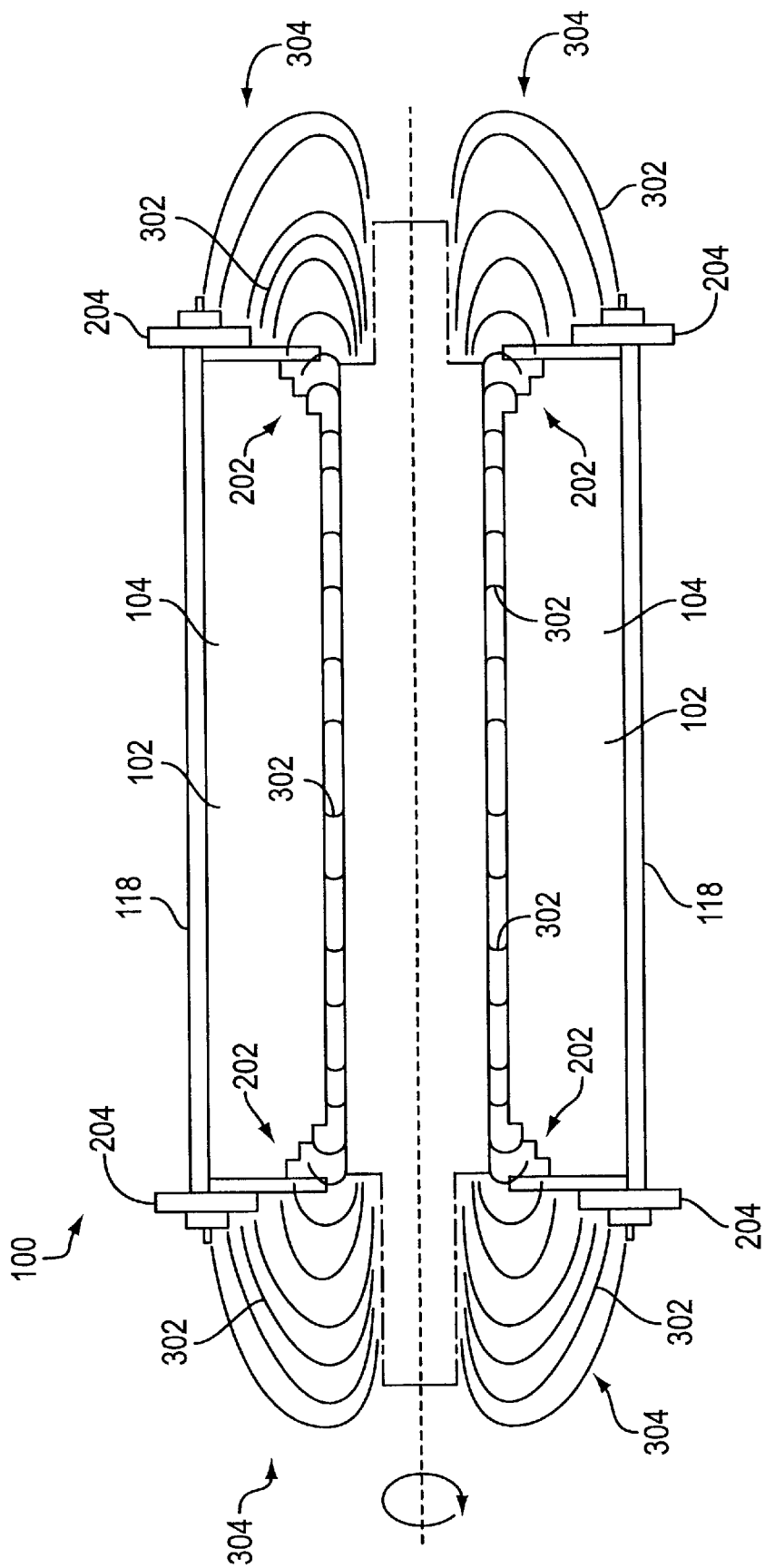
FIG. 3 is side view of a cross-section of the prior art power generator of FIG. 1 and illustrates a coupling of magnetic flux from a rotor of the power generator to a stator of the power generator as the rotor rotates inside of the stator.
Figure 4:
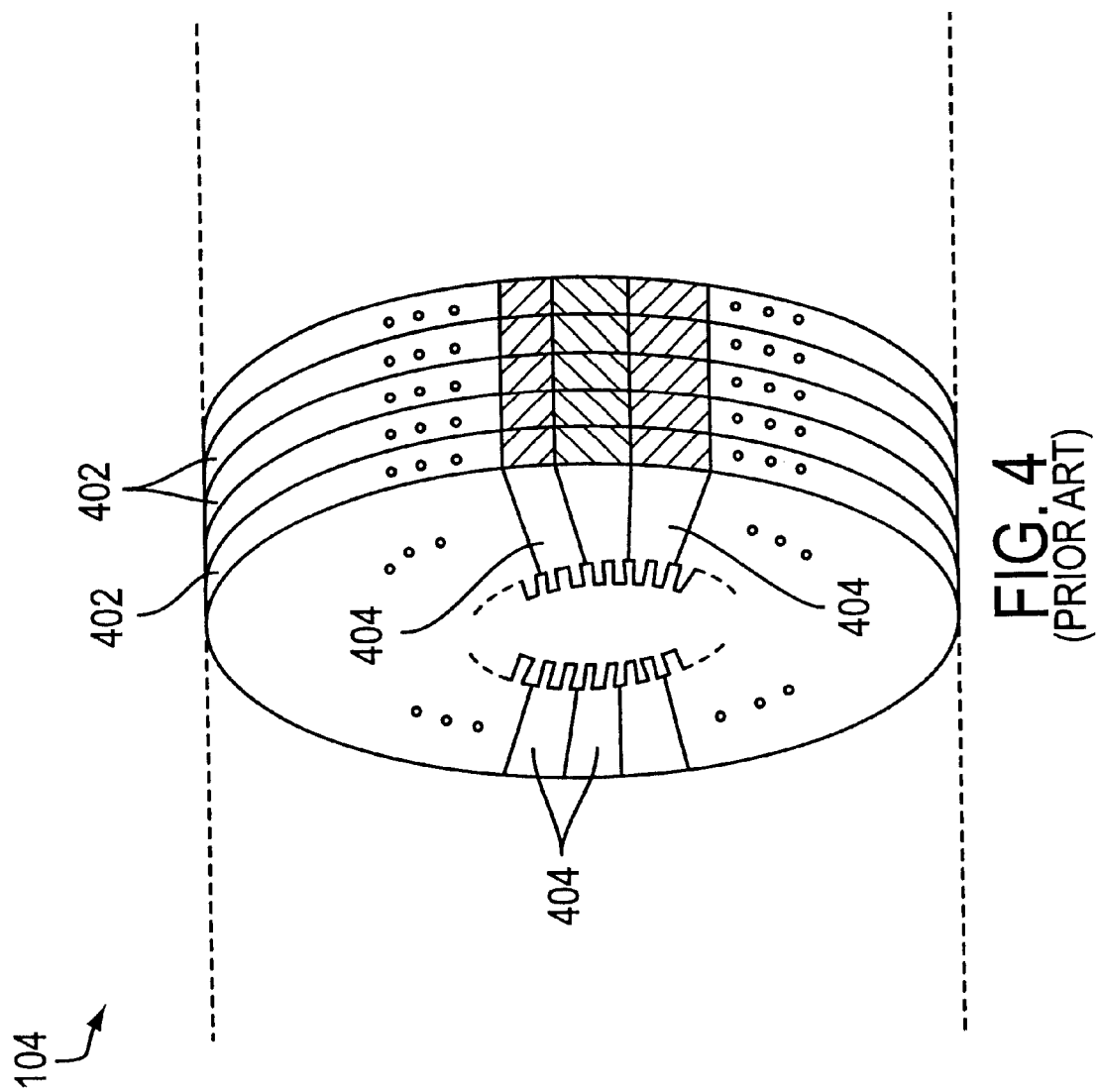
FIG. 4 is a partial perspective of the prior art power generator of FIG. 1.
Figure 5:
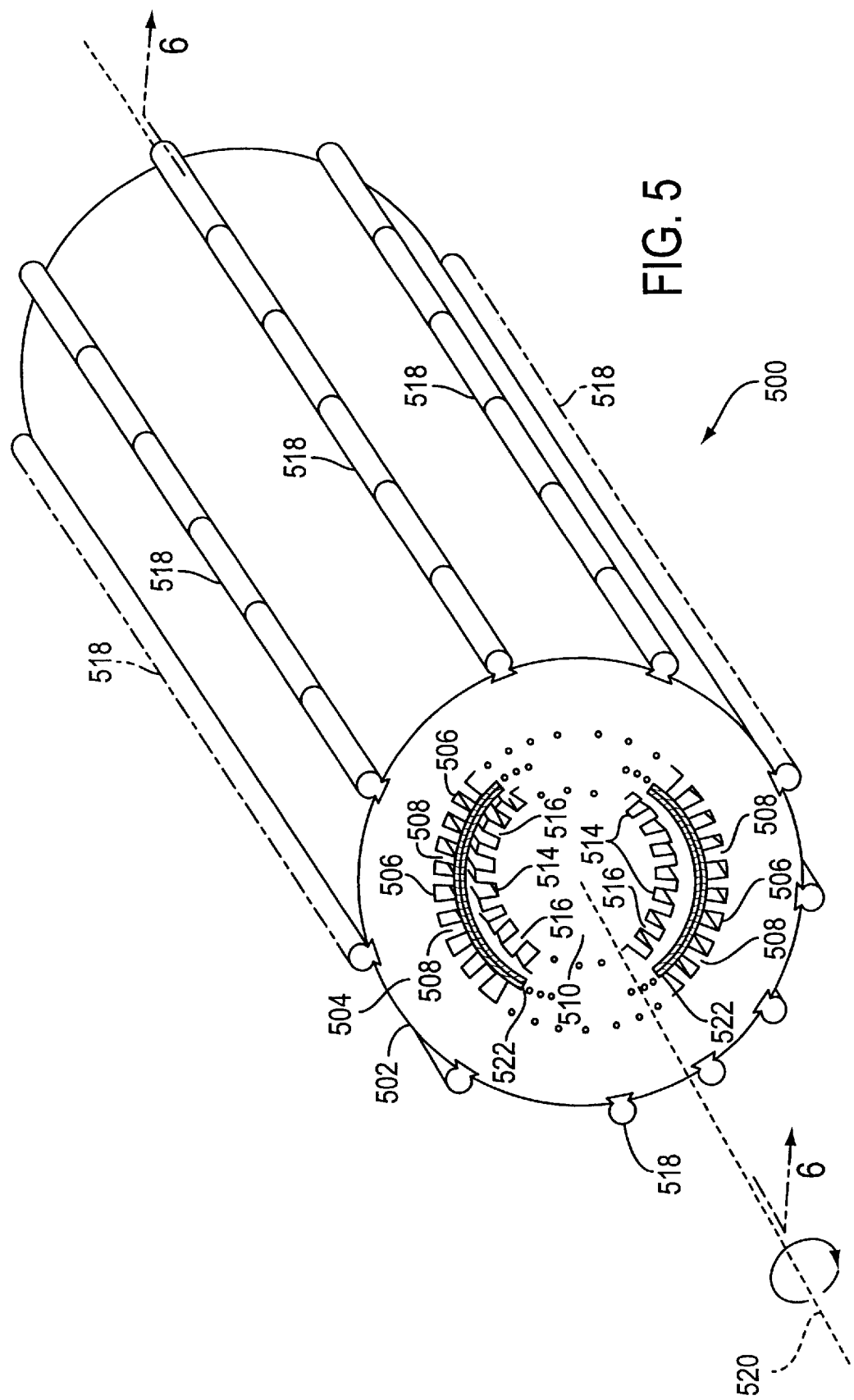
FIG. 5 is an end view of a cross-section of an exemplary power generator from an isometric perspective in accordance with an embodiment of the present invention.
Figure 6:
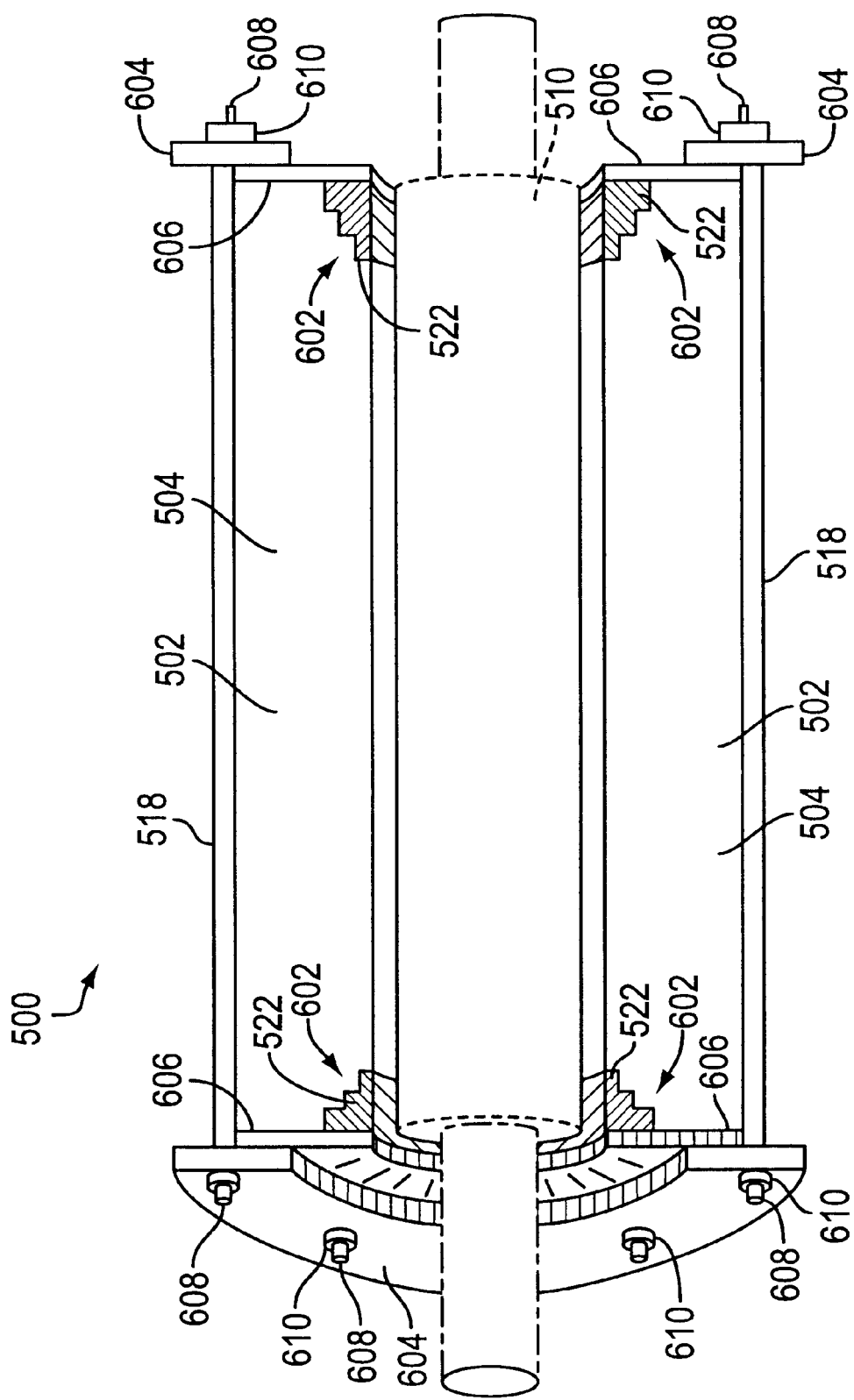
FIG. 6 is a cut-away view of the power generator of FIG. 5 along axis 7—7 as shown in FIG. 5 in accordance with an embodiment of the present invention.
Figure 7:
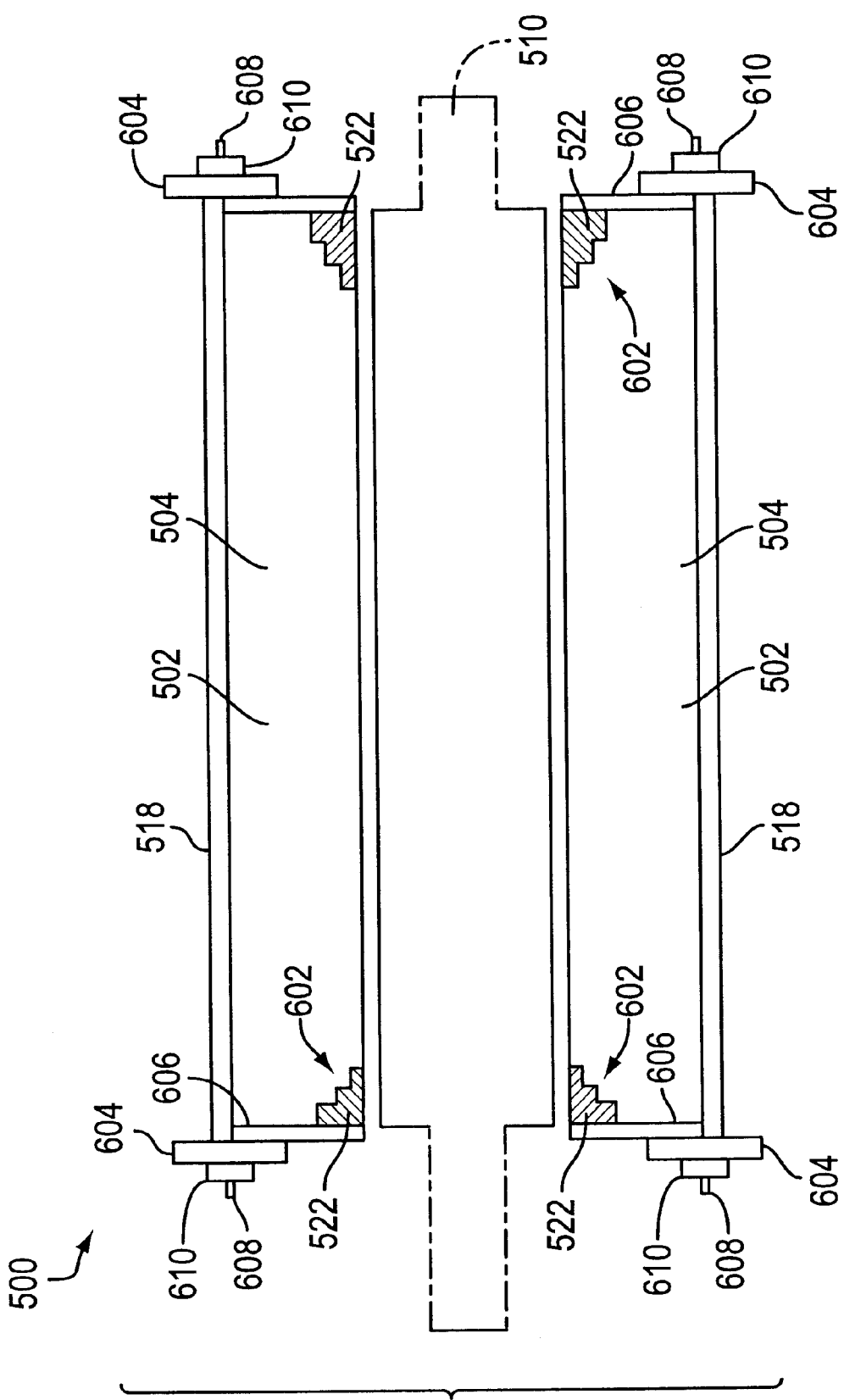
FIG. 7 is a side view of a cross section of the power generator of FIG. 5 in accordance with an embodiment of the present invention.

Referring now to FIGS. 5, 6, and 7, an exemplary power generator 500 that operates at a reduced stator temperature level and at reduced keybar voltage differentials is illustrated. FIG. 5 is an isometric perspective of an end view of a cross section of power generator 500. FIG. 6 is a cut-away view of electrical generator 500 along axis 6—6 as shown in FIG. 5. FIG. 7 is a cross-sectional side view of generator 500. Generator 500 includes a substantially cylindrical stator 502 having a stator core 504 and housing a substantially cylindrical rotor 510 rotatably disposed inside of the stator. Multiple circumferentially distributed and axially oriented keybars 518 are coupled together at each of a proximal end and a distal end by one of multiple flanges 604 (not shown in FIG. 5). Each keybar 518 is coupled to an outer surface of stator 502. The multiple keybars 518, together with the multiple flanges 604, form a keybar cage around the stator 502.

An inner surface of stator 502 includes multiple stator slots 506 that are circumferentially distributed around the inner surface of the stator. Each stator slot 506 is axially oriented and extends approximately a full length of stator 502. Each stator slot 506 receives an electrically conductive stator winding (not shown). Between each pair of adjacent stator slots 506 is a stator tooth 508 that, similarly, is circumferentially distributed around the inner surface of stator 102 and extends approximately a full length of stator 502. Each stator tooth 508 is radially oriented and extends radially inward toward rotor 510 from stator 502.

Figure 8:
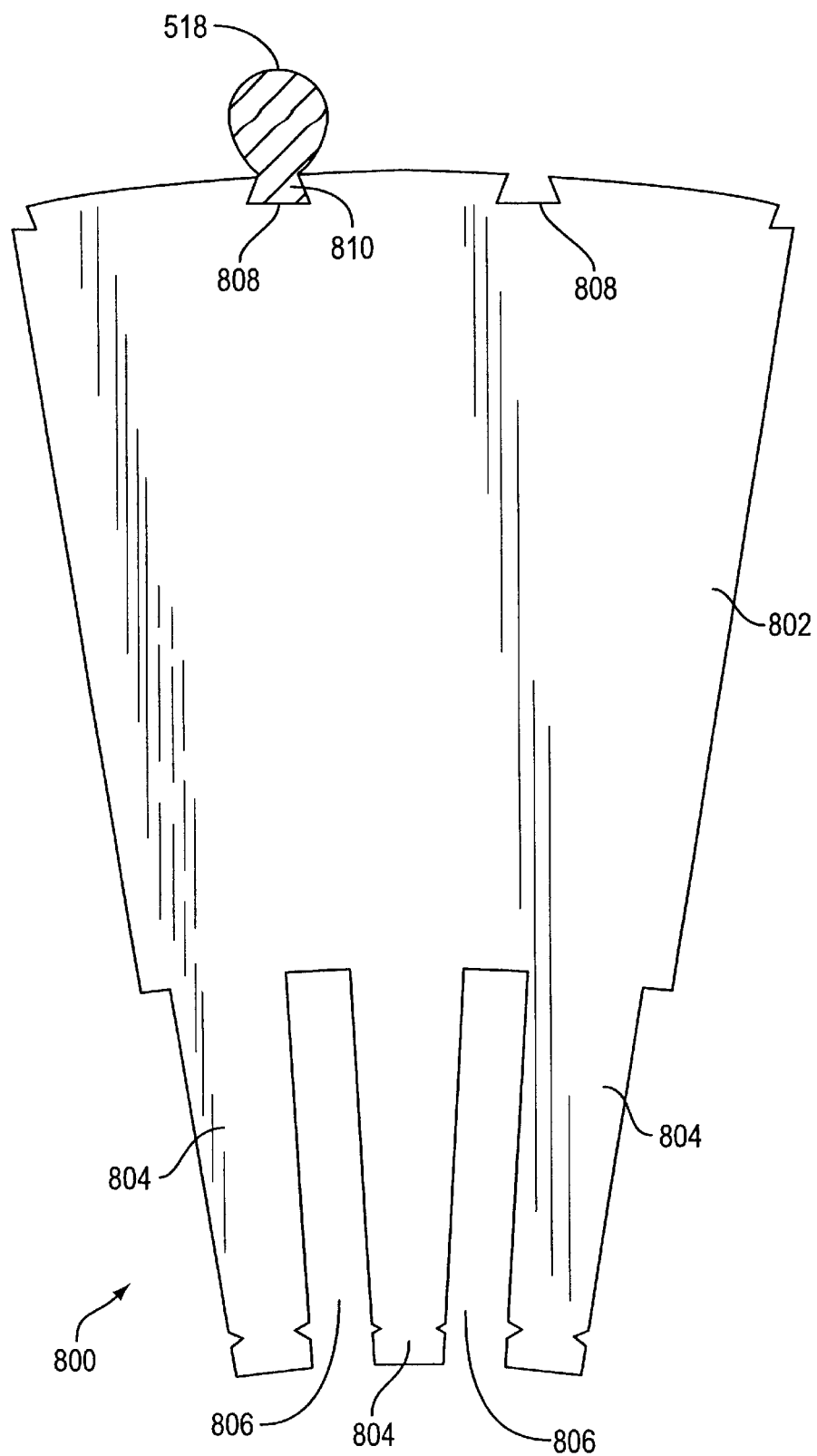
FIG. 8 is a top view of an exemplary lamination segment in accordance with an embodiment of the present invention.

Similar to stator core 104 of the prior art, stator core 504 preferably includes multiple, stacked ring-shaped laminations that are each divided into multiple lamination segments. FIG. 8 is a top view of an exemplary lamination segment 800. Lamination segment 800 includes a yoke 802 and one or more stator teeth 804. Between each pair of stator teeth 804 is a stator slot 806. Each lamination segment 800 further includes multiple dovetail-shaped slots 808 in an outer edge of the segment for mechanically coupling the lamination segment to one or more keybars 518. In turn, each keybar 518 includes an outer side and an inner, locking side 810. Locking side 810 includes a dovetail-shaped ridge that extends a length of the keybar and that is designed to mate with a dovetail-shaped slot 808 of a lamination segment 800. Each ring-shaped lamination, and each lamination segment 800 associated with the lamination, is fixed in position in stator 502 by sliding each lamination segment 800 of the ring-shaped lamination onto a keybar 518 via the dovetail-shaped slots 808 and the corresponding dovetail-shaped ridge of the keybar. Multiple flanges 604 then hold the multiple keybars 518 and, in association with the keybars, the multiple ring shaped laminations in position in stator core 504.

Rotor 510 is rotatably disposed inside of stator 502. Similar to rotor 110 of the prior art, rotor 510 has an outer surface that includes multiple rotor slots 514, which slots 514 are circumferentially distributed around the outer surface of rotor 510. Each rotor slot 514 is radially oriented and extends approximately a full length of rotor 510. Between each pair of adjacent rotor slots 514 is a rotor tooth 516 that similarly is circumferentially distributed around the inner surface of rotor 510 and extends approximately a full length of rotor 510. Each rotor tooth 516 is radially oriented and extends radially outward toward stator 502 from rotor 510. An air gap exists between stator 502 and rotor 510 that allows for a peripheral rotation of rotor 510 about axis 520.

The multiple flanges 604 are each disposed adjacent to an end of stator core 504. Disposed between each flange 604 and stator core 504 is an outside space block 606. Each of the multiple flanges 604 is a ring-shaped metallic material that includes multiple keybar stud apertures (not shown) for receiving a keybar stud 608. The apertures are circumferentially disposed around each flange 604 in positions that correspond to positions of keybars 518 around stator 502. Each end of each keybar 518 includes a threaded keybar stud 608 that extends axially outward from the end of the keybar. Each flange 604 is placed on an end of stator 502 and over the keybar studs 608 such that each stud extends through the flange via a corresponding keybar stud aperture. Each flange 604 is then mechanically fastened onto an end of stator 502 and the multiple keybars 518 by multiple threaded nuts 610 that are each screwed onto a correspondingly threaded keybar stud 608.

Similar to generator 100 of the prior art, each slot of the multiple rotor slots 514 receives an electrically conductive rotor winding (not shown) and each slot of the multiple stator slots 506 of generator 500 receives an electrically conductive stator winding (not shown). Each rotor winding typically extends from a proximal end of rotor 510 to a distal end of the rotor in a first rotor slot of the multiple rotor slots 514, and then returns from the distal end to the proximal end in a second rotor slot of the multiple rotor slots 514, thereby forming a loop around a portion of the rotor. Similar to the rotor windings, each stator winding typically extends from a proximal end of stator 502 to a distal end of the stator in a first stator slot of the multiple stator slots 506, and then returns from the distal end of the stator to the proximal end of the stator in a second stator slot of the multiple stator slots 506, thereby forming a stator winding loop.

A rotation of rotor 510 inside of stator 502 when a DC current is flowing in the multiple windings of rotor 510 induces magnetic fields in, and a passage of magnetic flux through, stator 502 and the loops formed by the stator windings. The passage of magnetic flux through the stator winding loops induces a current in the stator windings and a corresponding power generator output voltage. The rotation of rotor 510 also induces a "fringing" of the magnetic flux at each end of stator 502. In order to combat a buildup of heat due to fringing, an inner surface of stator core 504 includes multiple steps 602 that radially step the stator core away from rotor 510 at each end of the stator core. However, the radial stepping 602 alone does not fully prevent an undesirable buildup of heat at each end of stator core 504. Furthermore, the radial stepping 602 does not address the issue of "fringing" flux impinging upon each of the multiple flanges 604 or upon the ends of each of the multiple keybars 518. In order to further reduce the heat buildup and to reduce the impinging of "fringing" flux upon the keybars 518 and flanges 604, power generator 500 includes multiple flux shunts 522 that attract, and thereby redistribute, the fringing magnetic flux.

Each flux shunt 522 provides a low reluctance path for the fringing magnetic flux produced by a rotation of rotor 510. By providing a low reluctance path, each flux shunt 522 attracts the fringing magnetic flux that would otherwise axially impinge upon a flange 604 and upon an end of each of stator core 504 and multiple keybars 518. The fringing magnetic flux is thereby redirected from the flanges 604, stator core 504, and the multiple keybars 518 to the shunt 522. By redirecting the fringing magnetic flux, each flux shunt 522 reduces the current induced in, and concomitantly the energy and heat dissipated in, stator core 504 and flanges 604 by the fringing flux. Furthermore, by redirecting the fringing magnetic flux, each flux shunt 522 reduces the fringing flux coupling into an end of each keybar 518 and provides for a more uniform coupling of magnetic flux into the keybar. A more uniform coupling of magnetic flux into each keybar 518 reduces a likelihood of an induction of keytbar voltages and keybar currents in the keybar and reduces a development of keybar voltage differentials between each of the multiple keybars.

Preferably, each flux shunt 522 includes a magnetically isotropic material that is electrically highly resistive and thermally conductive and that has a higher axial permeability than stator core 504. For example, a flux shunt 522 may include a powdered iron composition, wherein the powdered iron composition is electrically highly resistive and thermally conductive, has a high isotropic permeability, and, due the to powdered nature of the composition, will produce minimal current and low losses when a magnetic field is applied to the composition. Those who are of ordinary skill in the art realize that other high resistance, high isotropic permeability materials or compounds may be used in flux shunt 522 without departing from the spirit and scope of the present invention.

Each flux shunt 522 has a radially outer surface that is disposed adjacent to the inner surface, or teeth 508, of stator 502 and a radially inner surface that is disposed opposite rotor 510. Preferably, each flux shunt 522 is further disposed in a section of stator 502, or stator core 504, that is radially stepped away 602 from rotor 510. In one embodiment of the present invention, a flux shunt of the multiple flux shunts 522 is disposed at a proximal end of stator 502, or stator core 504, and another flux shunt of the multiple flux shunts 522 is disposed at a distal end of the stator. However, in alternative embodiments of the present invention, flux shunt 522 may be inserted at either the proximal end of stator 502 or at the distal end of the stator. Furthermore, each flux shunt 522 is disposed in a manner such that the flux shunt does not obstruct the passage of the stator windings through stator core 504.

In one embodiment of the present invention, a flux shunt 522 may be substantially cylindrically-shaped and disposed adjacent to the inner surface of stator 502 at approximately an end of the stator. Preferably, flux shunt 522 is radially stepped outward to mate with the multiple steps of a stepped region 602 of stator 502. In another embodiment of the present invention, a flux shunt 522 may include multiple discrete rings that are each disposed adjacent to the inner surface of stator 502 and that each fits into one of the multiple steps included in each stepped region 602. In yet another embodiment of the present invention, a flux shunt 522 may include multiple segments that are discretely disposed around the periphery of the inner surface of stator 502, which segments may each mate with one or more steps of the multiple steps of a stepped region 602 of stator 502. The multiple segments, in combination, may or may not completely encircle the interior of a stepped region 602 of stator 502. In still another embodiment of the present invention, each ring or segment included in flux shunt 522 may include apertures that allow for the passage of gas through the shunt.

Figure 9:
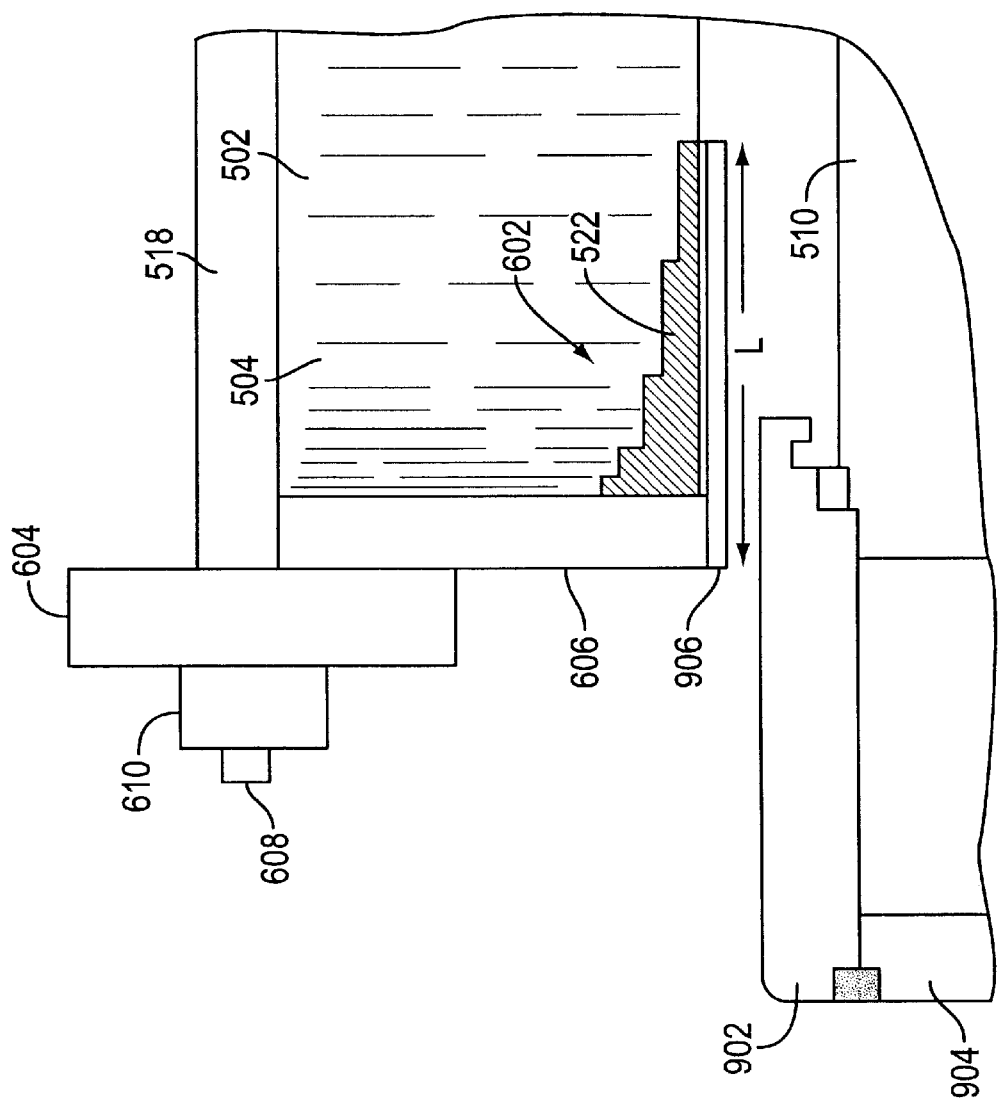
FIG. 9 is a cross-sectional side view of an end of the power generator of FIG. 5 in accordance with an embodiment of the present invention.

FIG. 9 is a partial side view of a cross-section of an end of stator 502 and rotor 510 in accordance with an embodiment of the present invention. Also shown in FIG. 9 is a retaining ring 902 and a centering ring 904 that fit over an end of the rotor windings (not shown) and that hold the windings in position as rotor 510 rotates inside of stator 502. In one embodiment of the present invention, flux shunt 522 is retained in position relative to stator core 504 by a flux shunt retainer 906. Flux shunt retainer 906 is disposed adjacent to the inner surface of flux shunt 522 and is affixed in position relative to stator core 504. Those who are of ordinary skill in the art realize that there are many ways of either removably or permanently affixing flux shunt retainer 906 in position relative to stator 502 without departing from the spirit and scope of the present invention. For example, flux shunt retainer 906 may be fastened by bolts or screws onto outside space block 606 in order to hold flux shunt retainer 906, and thereby flux shunt 522, in position relative to stator core 504. By way of another example, flux shunt retainer 906 can be welded to outside space block 606, or outside space block 606 may be milled in such a manner that the outside space block includes an inner lip that functions as flux shunt retainer 906.

Preferably, flux shunt retainer 906 is a substantially cylindrically-shaped ring that is disposed adjacent to the inner surface of flux shunt 522. However, those who are of ordinary skill in the art realize that flux shunt retainer 906 may include any design intended to hold flux shunt 522 in position relative to stator core 504, such as plates that are circumferentially disposed around the inner surface of flux shunt 522, which plates may be individually affixed to stator 502 or may be linked together to form a flux shunt retainer assembly that is affixed to stator 502, without departing from the spirit and scope of the present invention. Preferably, each plate or the ring included in flux shunt retainer 906 is of a length 'L' that is sufficient to hold flux shunt 522 in position relative to stator core 504, which length L may or may not be of a same length as flux shunt 522. By affixing flux shunt retainer 906 in position relative to stator 502, flux shunt 522 is also affixed in position relative to the stator.

In another embodiment of the present invention, flux shunt 522 may be directly affixed to outside space block 606 instead of using flux shunt retainer 906. For example, flux shunt 522 may be attached to outside space block 606 by an adhesive or may be mechanically fastened to the outside space block by a fastener such as a bolt or a screw. In yet another embodiment of the present invention, flux shunt 522 instead may be affixed to stator core 504, preferably by an adhesive or alternatively by a mechanical fastener. The means used to affix flux shunt 522 in position relative to stator 502 is not critical to the present invention, and other means of affixing the flux shunt in position relative to the stator may occur to those of ordinary skill in the art without departing from the spirit and scope of the present invention.

By including multiple flux shunts 522 that are each disposed adjacent to an inner surface of stator 502, power generator 500 is capable of operating at a lower temperature and at reduced keybar voltage differentials relative to the prior art. Each flux shunt 522 is disposed at either a proximal end of stator 502 or a distal end of the stator. Each flux shunt 522 has a high permeability and a low reluctance in all directions and attracts the fringing magnetic flux at the end of stator 502, redirecting the flux away from a flange 604 and from the ends of each of stator core 504 and the multiple keybars 518. By redirecting the fringing flux, each flux shunt 522 reduces eddy currents induced in, and energy and heat dissipated in, a flange 604 and ends of stator core 504 and multiple keybars 518 by the fringing flux, resulting in a more efficient power generator. Also, since stator core and flange temperatures can serve as operating constraints for power generators, a reduction of the operating temperatures of the stator core and flange for a given rotor 410 winding current can allow for the power generator to be operated at a higher rotor winding current and a higher output voltage.

In addition, by redistributing the fringing flux, each flux shunt 522 reduces the fringing flux impinging upon an end of each keybar 518 and causes a more uniform distribution of flux in the keybar. A more uniform distribution of flux in a keybar reduces the likelihood of keybar voltages and also reduces a likelihood of voltage differentials developing among the multiple keybars 518. By reducing the likelihood of voltage differentials, power generator 500 reduces a possibility of arcing in the stator core due to voltage differentials among laminations coupled to the keybar.

Furthermore, the multiple flux shunts 522 in power generator 500 are positioned in areas where only air gaps existed in the prior art. The inclusion of a flux shunt 522 where only an air gap previously existed results in an induction of an increased amount of magnetic flux and an increased output voltage for a given level of operation of power generator 500. Alternatively, the inclusion of a flux shunt 522 where only an air gap previously existed reduces the rotor winding current required to produce a given output voltage, resulting in a more efficient power generator.

Figure 10:
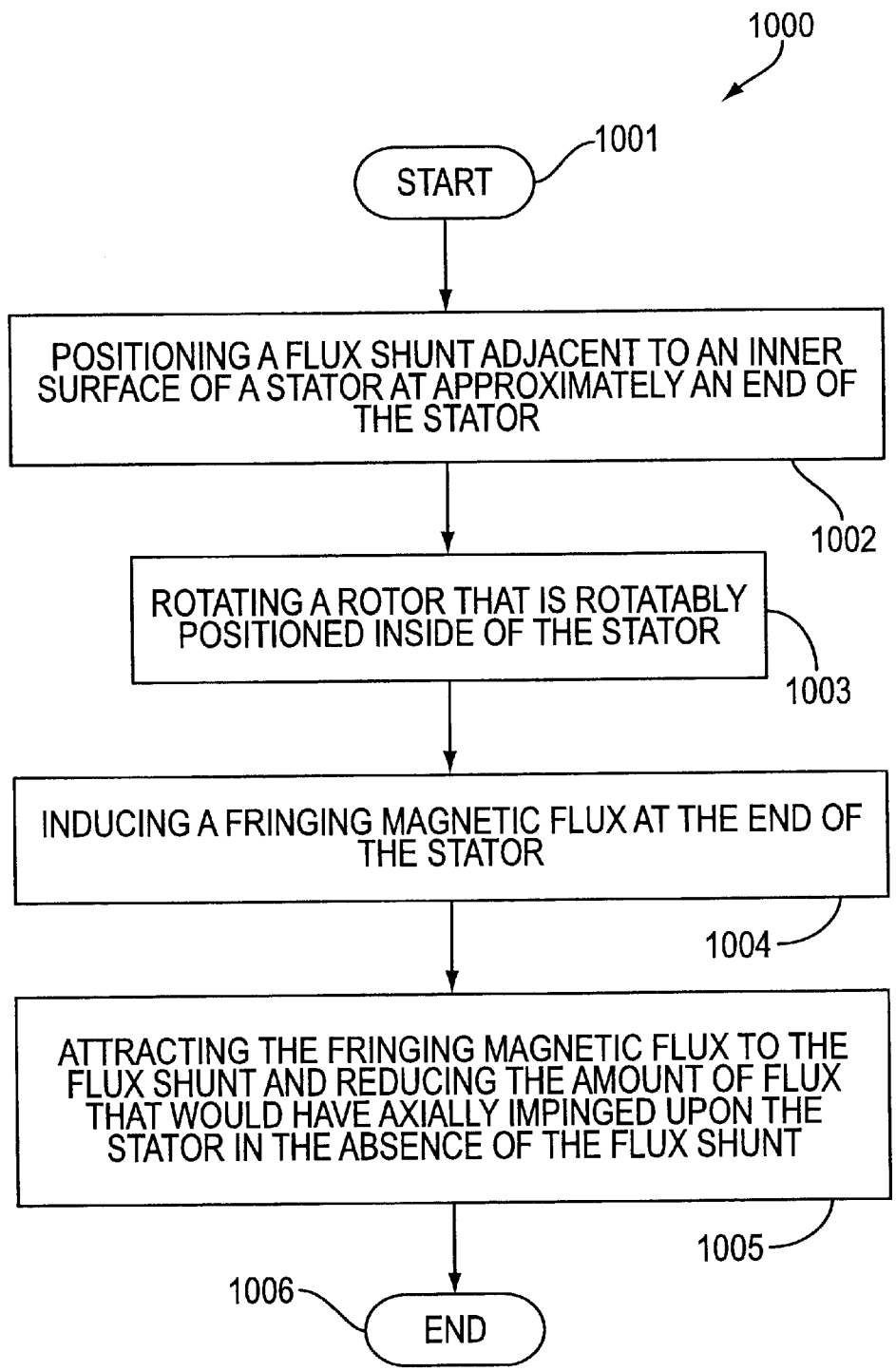
FIG. 10 is a logic flow diagram of steps executed in order to control flux in a power generator in accordance with an embodiment of the present invention.

FIG. 10 is a logic flow diagram 1000 of a method for controlling flux in a power generator in accordance with an embodiment of the present invention. Preferably, the power generator includes an approximately cylindrical stator having an inner surface, an outer surface, and a stator core, and a rotor rotatably disposed inside of the stator. The power generator further includes multiple axially oriented keybars that are circumferentially disposed around the outer surface of the stator and multiple flanges that are each disposed at an end of the stator. The logic flow begins (1001) when a flux shunt is positioned (1002) adjacent to the inner surface of the stator and at approximately an end of the stator. A rotating (1003) of the rotor induces (1004) a fringing magnetic flux at the end of the stator. The fringing magnetic flux is attracted (1005) to the flux shunt, and the logic flow ends (1006). The attraction of the fringing magnetic flux to the flux shunt results in a reduction of the amount of fringing magnetic flux that would otherwise axially, or normally, impinge upon the ends of the stator core and the multiple keybars and upon a flange of the multiple flanges.

By attracting (1005) the fringing flux to the flux shunt and redirecting fringing flux away from the stator core, flange, and keybars, the present invention reduces eddy currents and energy and heat dissipation in each of the stator core, flange, and keybars, resulting in a more efficient power generator. In addition, reduction of an amount of fringing magnetic flux impinging upon an end of each keybar causes a more uniform distribution of flux in the keybar, reduces the likelihood of keybar voltages, and reduces a likelihood of voltage differentials developing among the multiple keybars 518. Furthermore, when a flux shunt is positioned (1002) in areas of a power generator where only air gaps existed in the prior art, an increased amount of magnetic flux may be induced for a given level of operation of the power generator. An increased amount of magnetic flux results in an increased voltage induced by the flux in the stator windings, which in turn reduces the rotor winding current required to produce a given voltage and produces a more efficient power generator.

Figure 11:
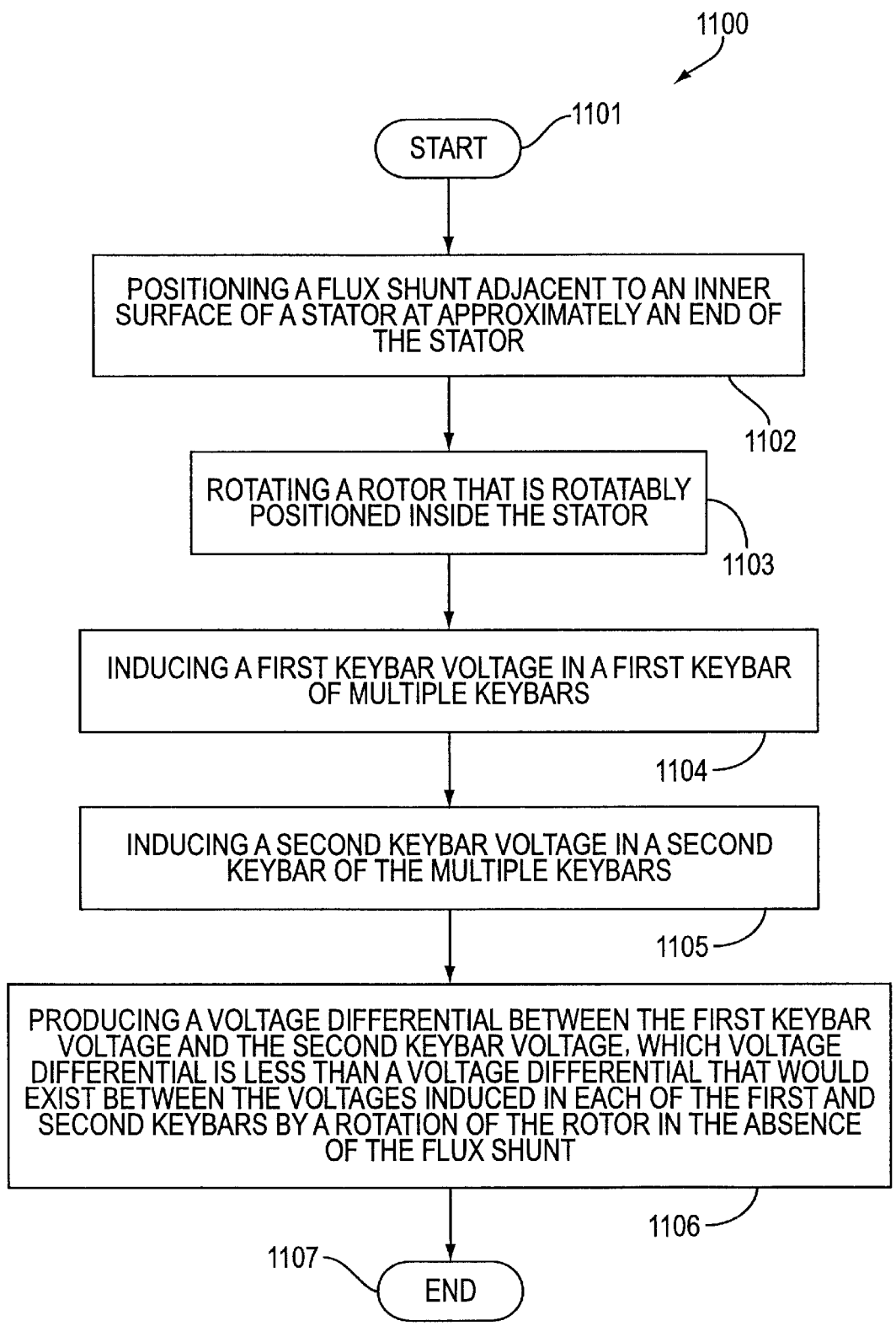
FIG. 11 is a logic flow diagram of steps executed in order to reduce a keybar voltage of a power generator in accordance with another embodiment of the present invention.

FIG. 11 is a logic flow diagram 1100 of a method for reducing a power generator keybar voltage differential in accordance with another embodiment of the present invention. Preferably, the power generator comprises an approximately cylindrical stator having an inner surface, an outer surface, and a stator core. The power generator further comprises multiple keybars axially disposed adjacent to the outer surface of the stator and a rotor rotatably disposed inside of the stator. The logic flow begins (1101) when a flux shunt is positioned (1102) adjacent to the inner surface of the stator and approximately at an end of the stator. A rotating (1103) of the rotor induces (1104) a first keybar voltage in a first keybar of the multiple keybars and further induces (1105) a second, different keybar voltage in a second keybar of the multiple keybars, producing (1106) a voltage differential between the first keybar voltage and the second keybar voltage. The voltage differential is less than a voltage differential that would exist between keybar voltages induced in each of the first and second keybars by a rotation of the rotor in the absence of the flux shunt. The logic flow then ends (1107).

In sum, a power generator is provided that includes multiple flux shunts that each reduces an amount of flux coupling into a stator, flange and into multiple keybars of the power generator during operation of the generator. By reducing the amount of flux coupling into a stator or flange, the power generator is able to operate at a reduced temperature level, or alternatively can be driven harder in order to operate at the same temperature level. By reducing the amount of flux coupling into the multiple keybars, a voltage differential between keybar voltages induced by the flux in each of the multiple keybars is reduced, reducing the potential for arcing and localized heating in the stator.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A flux shunt for use in a power generator comprising a stator having a stator core and a rotor rotatably disposed within the stator, the flux shunt comprising:
   a convex outer surface adapted to be disposed adjacent to a radial inner surface of the stator core; and
   a concave inner surface adapted to be disposed adjacent to a radial outer surface of the rotor;
   wherein the flux shunt attracts fringing magnetic flux in a power generator and wherein a permeability of the flux shunt is greater than a permeability of the stator core.

2. The flux shunt of claim 1, wherein the flux shunt comprises a magnetically isotropic material.

3. The flux shunt of claim 1, wherein the flux shunt is substantially cyltridncally-shaped.

4. The flux shunt of claim 1, wherein the flux shunt comprises multiple discrete rings capable of being disposed around the periphery of an inner surface of the stator.

5. The flux shunt of claim 1, wherein the flux shunt comprises plurality of segments capable of being discretely disposed around the periphery of an inner surface of the stator.

6. A power generator stator assembly comprising:
   a substantially cylindrical stator core comprising a radial inner surface, an outer surface, and two ends; and
   a flux shunt having a convex outer surface, the convex outer surface disposed adjacent to the inner surface of the stator core, the flux shunt disposed at one end of the two ends of the stator core, wherein a permeability of the flux shunt is greater than a permeability of the stator core.

7. The power generator stator assembly of claim 6, wherein the flux shunt comprises a first flux shunt disposed at a first end of the two ends, wherein the power generator stator assembly further comprises a second flux shunt disposed adjacent to the inner surface of the stator core at a second end of the two ends of the stator core, and wherein a permeability of each of the first flux shunt and the second flux shunt is greater than a permeability of the stator core.

8. The power generator stator assembly of claim 6, wherein the flux shunt comprises an approximately cylindrically-shaped insert that is disposed adjacent to the inner surface of the proximal end.

9. The power generator stator assembly of claim 8, wherein the inner surface of the stator core comprises multiple steps stepping the stator core away from a rotor disposed inside of the stator core, and wherein the flux shunt outer surface mates with the multiple steps of the stator core.

10. The power generator stator assembly of claim 6, wherein the flux shunt comprises a plurality of approximately ring-shaped inserts.

11. The power generator stator assembly of claim 6, wherein the flux shunt comprises a magnetically isotropic material.

12. The power generator stator assembly of claim 6, wherein the flux shunt comprises an inner surface and an outer surface, wherein the outer surface of the flux shunt is disposed adjacent to the inner surface of the stator core, and wherein the power generator stator assembly further comprises a flux shunt retainer that is disposed adjacent to the inner surface of the flux shunt.

13. A power generator comprising:
   an approximately cylindrically-shaped stator comprising a stator core, a radial inner surface, an outer surface, and two ends;
   a flux shunt radially disposed adjacent to the inner surface of the stator at approximately an end of the two ends of the stator, and
   a rotor rotatably disposed inside of the stator;
   wherein a rotation of the rotor causes an induction of a magnetic flux that is greater than the magnetic flux that would be induced in the absence of the flux shunt.

14. The flux shunt of claim 2, wherein the magnetically isotropic material comprises powdered iron.

15. The power generator stator assembly of claim 11, wherein the magnetically isotropic material comprises powdered iron.

16. The power generator stator assembly of claim 12, wherein the flux retainer is affixed to an outside space block disposed at one of the two ends.

17. The power generator stator assembly of claim 6, wherein the convex outer surface of the flux shunt is attached to the radial inner surface of the stator core.

18. A power generator stator assembly comprising:
   a stator core having a radial inner surface; and
   a flux shunt formed from an electrically resistive, thermally conductive, and magnetically permeable material, the flux shunt having a convex outer surface disposed adjacent to the radial inner surface of the stator core.

19. The power generator stator assembly of claim 18, wherein the electrically resistive, thermally conductive, and magnetically permeable material comprises a magnetically isotropic material.

20. The power generator stator assembly of claim 19, wherein the magnetically isotropic material comprises powdered iron.

21. The power generator stator assembly of claim 18, wherein the stator core comprises opposing axial ends and the flux shunt is disposed at one of the opposing axial ends.

* * * * *

UNITED STATES PATENT AND TRADEMARK OFFICE
CERTIFICATE OF CORRECTION

PATENT NO. : 6,608,419 B2
DATED : August 19, 2003
INVENTOR(S) : Manoj Ramprasad Shah et al.

It is certified that error appears in the above-identified patent and that said Letters Patent is hereby corrected as shown below:

<u>Column 9,</u>
Line 60, "cyltridncally" has been replaced with -- cylindrically --.

Signed and Sealed this

Seventh Day of October, 2003

JAMES E. ROGAN
*Director of the United States Patent and Trademark Office*